US011736189B2

(12) United States Patent
Nyamwange (10) Patent No.: US 11,736,189 B2
(45) Date of Patent: Aug. 22, 2023

(54) LIGHT FIDELITY TRANSMISSION NETWORK SECURED WITH FRICTIONLESS AGENT-CENTRIC AUTHENTICATION DATA CHAINS

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 369 days.

(21) Appl. No.: 17/243,854

(22) Filed: Apr. 29, 2021

(65) Prior Publication Data

US 2022/0352983 A1 Nov. 3, 2022

(51) Int. Cl.
| H04B 10/116 | (2013.01) |
| H04L 9/32 | (2006.01) |
| G06Q 20/38 | (2012.01) |
| G06Q 20/22 | (2012.01) |
| H04L 9/00 | (2022.01) |

(52) U.S. Cl.
CPC ......... *H04B 10/116* (2013.01); *G06Q 20/223* (2013.01); *G06Q 20/382* (2013.01); *H04L 9/3236* (2013.01); *H04L 9/50* (2022.05); *H04L 2209/56* (2013.01)

(58) Field of Classification Search
None
See application file for complete search history.

(56) References Cited

U.S. PATENT DOCUMENTS

| 7,451,217 | B2* | 11/2008 | Wardrop | G06F 21/335 |
| | | | | 709/225 |
| 9,009,805 | B1* | 4/2015 | Kirkby | H04N 21/4622 |
| | | | | 709/224 |
| 9,544,766 | B2* | 1/2017 | Hranilovic | H04L 63/18 |
| 10,075,334 | B1* | 9/2018 | Kozura | H04W 12/086 |
| 10,397,777 | B2* | 8/2019 | Kumar | H04B 10/116 |
| 10,826,699 | B2* | 11/2020 | Mars | G06Q 20/204 |
| 11,445,369 | B2* | 9/2022 | Kwatra | H04W 12/068 |
| 11,469,789 | B2* | 10/2022 | Sharma | H04B 1/16 |
| 11,546,728 | B2* | 1/2023 | Mars | G06Q 20/321 |
| 11,653,200 | B2* | 5/2023 | Wu | G01S 19/48 |
| | | | | 726/7 |
| 2013/0276140 | A1* | 10/2013 | Coffing | H04L 63/104 |
| | | | | 726/27 |

(Continued)

FOREIGN PATENT DOCUMENTS

KR 102158319 6/2016

OTHER PUBLICATIONS

Unverified Machine Translation of KR102158319, Generated by European Patent Office on Apr. 20, 2021.

*Primary Examiner* — Jai M Lee
(74) *Attorney, Agent, or Firm* — Weiss & Arons LLP (57) ABSTRACT

Aspects of this disclosure relate to utilizing a 360-degree light source and frictionless authentication methods to provide access to a secure network and associated services. Data transmission is conducted via a light source that is also used to illuminate a location. An agent-centric method of frictionless data authentication and transfer is applied. The agent-centric authentication methods may be power efficient for use in connection with a mobile device having limited battery capacity and limited bandwidth.

20 Claims, 7 Drawing Sheets

(56) References Cited

U.S. PATENT DOCUMENTS

| | | | |
|---|---|---|---|
| 2014/0282877 A1* | 9/2014 | Mahaffey | H04W 12/33 |
| | | | 726/3 |
| 2014/0331060 A1* | 11/2014 | Hayton | G06F 21/32 |
| | | | 713/185 |
| 2014/0331286 A1* | 11/2014 | Davis | G06F 21/34 |
| | | | 726/4 |
| 2015/0319158 A1* | 11/2015 | Kumnick | H04L 63/083 |
| | | | 726/9 |
| 2015/0371214 A1* | 12/2015 | Schröder | H04L 63/0853 |
| | | | 705/44 |
| 2016/0352751 A1* | 12/2016 | Perrufel | H04W 12/06 |
| 2018/0316425 A1 | 11/2018 | Katiyar et al. | |
| 2021/0377047 A1* | 12/2021 | Haque | H04L 9/3268 |
| 2022/0312195 A1* | 9/2022 | Schnabel | H04W 12/63 |
| 2023/0019627 A1* | 1/2023 | Shankar | G06Q 20/36 |

\* cited by examiner

LIGHT FIDELITY TRANSMISSION NETWORK SECURED WITH FRICTIONLESS AGENT-CENTRIC AUTHENTICATION DATA CHAINS

FIELD OF TECHNOLOGY

Aspects of this disclosure relate to using a 360-degree projection light-emitting diode ("LED") to generate a signal carrier that drives a light fidelity ("Li-Fi") communication network. Access to the Li-Fi network is secured with a lightweight agent-centric authentication data chain.

BACKGROUND

Despite the fast pace of innovation in recent years, for many the "digital divide" still remains a barrier to social and technological advancement. Access to high-speed internet is often lower than one might think. In the United States, more than 6% of the population (about 21 million people) do not have a high-speed internet connection. According to the United Nations Educational, Scientific and Cultural Organization ("UNESCO"), globally only about 55% of households have access to a high-speed internet connection. This number is even lower for developing nations. Only 47% of households in developing nations have high-speed internet access, and in the least developed countries, just 19% of households have access.

There is an urgent need to enhance access to high-speed internet access and the digital services available over the internet. However, providing open access to high-speed internet access exposes those networks to viruses and other malware that may infect the devices of connecting users. Increasing a risk that devices of an already vulnerable population will be exposed to malware would counterbalance advantages of providing access to high-speed internet access.

On the other hand, requiring traditional username and passwords to login and access the internet also creates a barrier to such access. Internet access may only be provided at select locations controlled by computer gateways capable of authenticating users. Users must also have internet access to sign up for an account and register their usernames and passwords. Finally, there is an ongoing obligation to secure the login credentials and remember those credentials. Forgetting the credentials and or being required to reset them creates additional barriers to seamless internet access.

Moreover, it would be desirable to provide access to high-speed internet using a power efficient transmission architecture. Many users may attempt to access the internet using mobile devices that have limited battery life. Traditional wireless communication protocols use significant power, which limits the connectivity time a mobile device. For example, ZigBee is particularly low-power transmission protocol and requires approximately 20 to 60 milliwatts ("mW") of power for a transmission range of 10 to 100 meters and a data transmission rate of only 250 kilobits per second.

Therefore, it would be desirable to provide a network that provides high-speed internet access at low power consumption rates. It would also be desirable to provide for frictionless, on-demand, yet secure authentication to such a high-speed network. It is desirable to provide apparatus and methods that solve the technological challenges that have prevented bridging the digital divide.

Accordingly, it is desirable to provide apparatus and methods for a LIGHT FIDELITY TRANSMISSION NETWORK SECURED WITH FRICTIONLESS AGENT-CENTRIC AUTHENTICATION DATA CHAINS which provide technical solutions for providing high speed internet access utilizing a LI-FI communication network secured by lightweight agent-centric authentication data chains.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Apparatus and method for a LIGHT FIDELITY TRANSMISSION NETWORK SECURED WITH FRICTIONLESS AGENT-CENTRIC AUTHENTICATION DATA CHAINS are provided.

An agent-centric method of frictionless data authentication and transfer are provided. Methods may be power efficient. Methods may be used in connection with a mobile device having limited battery capacity and limited bandwidth relative to desktop computer systems. Methods may include exposing a light receptor of a mobile device to a light source. The light source may be controlled by a peer application. The light source controlled by the peer application may be a LED bulb. The LED bulb may project light 360-degrees around the LED bulb. The light receptor converts light signals received from the LED bulb into electric signals. An illustrative light receptor may include a photodiode. A photodiode may be silicon based.

A light source and light receptor may be configured to transmit and receive information using light-fidelity ("Li-Fi") communication protocols. Li-Fi utilizes short range optical wireless communication technology to provides the connectivity within a network. Li-Fi may utilize any suitable light source including Light-Emitting Diodes (LEDs) to transmit data. Li-Fi utilizes visible light as a signal carrier instead of traditional radio frequency carrier signal. Visible light rays typically have wavelengths of 400-750 nanometers and frequencies of 400-800 terahertz. Currently, standardization process for visible light communication is within the Institute of Electronic and Electrical Engineers ("IEEE") wireless personal area networks working group 802.15.

A first copy of the peer application may be run on a network gateway or other computer system that controls access to a secure network. The network gateway may control access to the secure network by communicating with the mobile device using the light source. For example, the network gateway may alter a current provided to the light source. Altering the current may cause the light source to flicker on and off, thereby encoding data into the light emitted by the light source. For example, the light source may transmit a digital 1 when the light source is on (e.g., emitting light) and a digital 0 when the light source is off. Varying the rate at which the light source is turned on or off will generate different strings of 1s and 0s.

The light source may transmit information to the mobile device by modulating light emitted from the light source at a frequency that is not perceptible by the human eye. For example, intensity of light emitted by the light source may be modulated so rapidly that the modulation cannot be perceived by the human eye. To the human eye, the light source will appear to emit a constant source of light.

Orthogonal Frequency Division Multiplexing ("OFDM") may be utilized to vary the intensity of emitted light at a rate that is imperceptible by the human eye. Therefore, the light source may also be used to illuminate an area and provide for data transmission. Accordingly, preexisting light sources that have been installed to provide illumination in buildings may be utilized to provide efficient high-speed internet access and data access to a secure network. Data transmission using a light source may provide a data transmission rate of close to 4 gigabits ("Gbps") per second operating on just 5 milliwatts of power.

Additional data communication techniques may be applied to increase data transfer rates. Such techniques may include using an array of light sources, where each light source transmits a different data stream. Such techniques provide for parallel data transmission. Other techniques may include using mixtures of red, green and blue light sources to create different data channels based on frequency of light emitted by each light source.

In response to a light receptor of the mobile device capturing a light signal emitted by the light source, a second copy of the peer application may be running on the mobile device. Methods may include using the second copy of the peer application to formulate an authentication token on the mobile device. The second copy of the peer application may formulate the authentication token based on a validation chain stored locally on the mobile device.

The validation chain may be a hash chain or hash tree. These hash structures ensure that a tamper-proof record of data is stored in the validation chain on the mobile device. As the mobile device interacts with other devices or network nodes running versions of the peer application, additional data entries are added to the locally stored validation chain. Each version of the peer application includes an identical set of validation rules that define when a change can be made to a validation chain.

Every device running a version of the peer application builds their own locally stored validation chain. Each entry to a validation chain is cryptographically signed by a device before being committed to the validation chain. The validation rules associated with a peer application may require that any entry that describes an interaction with another device must be countersigned by that other device before the entry is committed to a local validation chain.

After a data entry is added to a local validation chain, the new entry is shared with a distributed hash table ("DHT"). The DHT is composed of devices that are each running a version of the peer application. Each device running the peer application is a node on the DHT. Because each node on the DHT is running a version of the peer application, each node will apply identical validation rules to each data entry. The validation rules ensure that each node only accepts data entries that conform to the validation rules defined by the peer application. The nodes on the DHT will only store a data entry if the node confirms that the data entry conforms to the validation rules defined by the peer application. If a target node submits a data entry that violates the validation rules, the target node will reject the entry submitted by the target node.

The target node that proposed the non-compliant data entry will have forked away their validation chain from the validation rules enforced by other nodes running the peer application on the DHT. The target node will have been deemed to be running a manipulated version of the peer application that is applying a different set of validation rules that do not comply with the validation rules enforced on the DHT.

Using a gossip communication protocol, any node on the DHT that is asked to store a non-compliant entry by the target node will inform other nodes on the DHT that that the target node is attempting to store data that does not comply with the validation rules defined in the peer application. All other nodes on the DHT will not accept any other data from the target node.

This agent-centric approach for validating data entries does not rely on a central server or authority to validate data. The validation chain stored on each individual node may be examined by any other node. If the examining node confirms that the validation chain complies with the validation rules in place on the DHT, the node may be deemed to be a reliable node that is correctly and reliably applying the validation rules. The ability of each node on the DHT to inspect data entries and decision whether to reject a non-compliant data entry maintains the integrity and reliability of data stored in the DHT.

Even if a node successfully convinces other nodes to collude on accepting a data entry that violates the validation rules, eventually, the data entry will propagate to a "righteous" node that will reject the entry and inform other nodes of the source of the invalid entry.

A length of the validation chain stored locally on a node may determine reliability of the node. A relatively longer chain may indicate that the node has been correctly applying the validation rules for a longer period of time. Identification of a node that is correctly and reliably applying the validation rules may be used to authenticate the node. For example, a network gateway may examine a length of the locally stored validation chain.

If the node has a validation chain that indicates it has been correctly applying the validation rules for a threshold number of entries in a validation chain, the node may be granted access to a secure network. If the node attempts to generate a data entry that does not comply with the validation rules, the node may be blocked from accessing the secure network.

The authentication token generated by the mobile device may be a length of its validation chain, a copy of its validation chain or a segment of the validation chain stored locally on the mobile device. The authentication token may be a new data entry that is formulated by a copy of the peer application running on the mobile device. The authentication token may be a new data entry that is formulated by the copy of the peer application running on the mobile device in response to an authentication request received from the light source.

Methods may include, using a light emitter embedded in the mobile device, transmitting the authentication token to the copy of the peer application running on the network gateway. An illustrative light emitter may include a Li-1$^{st}$ Li-Flame product offered by PureLiFi of Edinburgh, Scotland. Alternatively, a light emitter may be a light source such as a flash bulb built into the mobile device. Transmitting the authentication token to the network gateway may itself be a request for the mobile device to access to a secure network via communication with the light source controlled by the network gateway.

Methods may include via the light source, receiving an access authorization token generated by a copy of the peer application running on the network gateway. The access authorization token may serve as confirmation that the validation chain or segment thereof presented by the mobile device conforms to validation rules defined by the peer application. Methods may include presenting the access authorization token to access to any node on the secure network. Each node on the network may confirm that the access validation token has been generated using the validation rules defined by the peer application that controls access to the secure network.

Methods may include using the copy of the peer application running on the mobile device, formulating a transaction for execution by a target node on the secure network. Using the light emitter, methods may include transmitting the transaction and the access authorization token to the target node. Methods may include using the light receptor on the mobile device, receiving an acceptance of the transaction.

The acceptance may be generated by a copy of the peer application running on the target node. The copy of the peer application running on the target node may confirm that the transaction has been formulated by the mobile device in accordance with validation rules defined by the peer application. For example, the peer application running on the target node may validate the access authentication token generated by the network gateway by confirming that the access authorization token generates an expected hash value.

The copy of the peer application running on the target node may validate the transaction submitted by the mobile device by requesting that a threshold number of nodes on the secure validate the transaction. Each of the nodes on the secure network may be running a copy of the peer application that defines validation rules in effect on the secure network. After the target node receives confirmation from each of the threshold nodes that the transaction has been successfully validated, the target node may provide the acceptance to the mobile device.

Methods may include adding the transaction and the acceptance to the validation chain stored locally on the mobile device. Methods may include sharing a copy of the transaction and the acceptance with a threshold number of nodes on the secure network. The sharing may include storing the transaction and acceptance in one or more node of a DHT. The threshold number of nodes may be determined based on geographic proximity to the mobile device. Utilizing nodes that are geographically near the mobile device may improve response time when attempting to access data stored by those nodes.

Methods may include using the light receptor on the mobile device, receiving a transaction request from a target node on the secure network. Using the copy of the peer application running on the mobile device, methods may include attempting to validate the transaction request received from the target node. Methods may include determining that transaction request received from the target node is invalid.

The copy of the peer application running on the mobile device may determine that the transaction request is invalid because it violates a validation rule defined by the peer application. In response to detecting the invalid transaction, the mobile device may inform at least two other nodes on the secure network that the transaction request received from the target node has been rejected.

Each of the threshold number of nodes may be running their own local copy of the peer application that defines the validation rules in effect on the secure network. The fact that each node on the network is running a peer application with identical validation rules ensures that the network is defined as a secure network. The fact that the target node has attempted to execute an invalid transaction may be further propagated through the secure network using a gossip communication protocol. When the target node attempts to execute another transaction with another node on the secure network, the node may reject the transaction without even checking whether it complies with the validation rules defined by the peer application.

Methods may include providing the mobile device access to an unsecure network via the light source. After the mobile device is authenticated by the network gateway that controls the light source, the network gateway may provide access to the unsecure network. The unsecure network may include the internet or other networks where all nodes on the network are not running a copy of the same peer application.

Methods may include providing an application program interface ("API") for allowing any node on the unsecure network to securely interact with the mobile device. The API may require that the network gateway or any other node on the secure network validate a transaction between the mobile device and another node on the unsecure network. The network gateway may provide verification to a node on the unsecure network that the mobile device has been issued a valid access authorization token. The network gateway may provide verification to the mobile device that the node on the unsecure network has been issued a valid access authorization token by the network gateway. The network gateway may confirm that the transaction conforms to the validation rules in effect on the secure network. The network gateway may authenticate the node on the unsecure network using a username and password or any other suitable authentication method.

Only nodes on the secure network may have access to the validation chain stored locally on the mobile device. Only nodes on the secure network may be able to validate changes to each other's validation chains. Only nodes on the secure network may be able to access and store data in a DHT associated with the secure network. For example, sharing a transaction and acceptance with a threshold number of nodes on the secure network may include storing the transaction and the acceptance in a DHT.

Apparatus for an agent-centric data communication system configured for frictionless authentication is provided. The system may include a node on a secure network. A node may be a computer system that includes a processor circuit. The processor circuit may control overall operation of the computer system. A processor circuit may include hardware, such as one or more integrated circuits that form a chipset. The hardware may include digital or analog logic circuitry configured to perform any suitable (e.g., logical) operation.

The node may include one or more of the following hardware components: I/O circuitry, which may include a transmitter device and a receiver device which interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

The node may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the node may be stored within the non-transitory memory and/or other storage medium. Software applications may provide instructions to the processor that enable the node to perform various functions. For example, the non-transitory memory may store software applications such as an operating system, application programs, machine learning algorithms, a peer application and associated validation routines and an associated database. Alternatively, some or all of computer executable instructions of a software application may be embodied in hardware or firmware components of a node.

Software applications may include computer executable instructions for invoking user functionality related to communication, such as email, short message service ("SMS"), and voice input and speech recognition applications. Software application programs may utilize one or more algorithms that process received executable instructions, perform power management routines, store or extract data from a DHT or other suitable tasks.

Software applications may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. A node may rely on a network of remote servers hosted on the internet to store, manage, and process data (e.g., "cloud computing" and/or "fog computing").

A node may be part of two or more networks. Each network may be associated with its own validation rules. The node may run two or more peer applications. Each peer application may implement a distinct set of validation rules. A computing system may support establishing network connections to one or more remote computing systems. Illustrative network connections may include a local area network ("LAN") and a wide area network ("WAN"). When used in a LAN networking environment, a node may be connected to the LAN through a network interface or adapter. A node may include a communication circuit. The communication circuit may include a network interface card or adapter.

When used in a WAN networking environment, a node may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a node may be operated in a client-server configuration to permit a user to retrieve web pages from a web-based server. Web browsers can be used to display and manipulate data on web pages.

The node may include components, such as a display, battery, speaker, and antennas. Components of a node may be linked by a system bus, wirelessly or by other suitable interconnections. Components of a node may be present on one or more circuit boards. In some embodiments, the components may be integrated into a single chip. The chip may be silicon-based. The node may include a photodiode. The photodiode may be a high bandwidth photodiode capable of receiving data at rates of 15 Gbps.

The node may include a LED bulb. The LED bulb may include multiple luminosity modules. Each luminosity module may project light beams in a different direction. The multiple luminosity modules may allow the LED bulb to project light 360-degrees around the LED bulb. Projecting light 360-degrees around the bulb allows any device within a line of sight of the LED bulb to receive a data signal emitted by the bulb. The node may be configured to transmit light signals by altering an electrical current applied to the LED bulb.

The node may run a first instance of a peer-application. The peer application may define a set of validation rules in effect on a secure network. The validation rules may define when and how a node on the secure network may change data stored in its internal and locally stored validation chain. The peer application may be configured to receive light signals captured by a photodiode. The photodiode may be configured to convert captured light into electric signals. The converted electrical signals may then be processed by the node.

Apparatus may include a mobile device. The mobile device may include a light emitter. The light emitter may be an LED bulb. The LED bulb may be embedded in the mobile device. The LED bulb may be embedded in a front facing screen bezel of the mobile device. The LED bulb may be embedded in a thickness of the mobile device such that light is emitted from a top of the mobile device. The LED bulb may be embedded in any suitable part of the mobile phone. The embedded LED bulb may be a monochrome or multi-color (e.g., RGB) LED bulb. The mobile device may include a light receptor. The light receptor may be a passive circuit that only draws power when a light signal is received by the mobile device.

The light receptor may capture light emitted by a light source. An illustrative light source may include a 360-degree projection LED bulb controlled by a node on the secure network. The LED bulb may be controlled by a network gateway. The light receptor on the mobile device may convert captured light into electric signals. The mobile device may include voltage regulator and level shifter circuits. These circuits may be used to convert or maintain a voltage level between a light transmitter and light receptor.

The mobile device may include a processor running a second instance of the peer application. The mobile device may be configured to formulate an authentication token using the second instance of the peer application. The mobile device may be configured to commit the authentication token to a validation chain stored locally on the mobile device. Using the light emitter, the mobile device may transmit the validation chain or a segment thereof to the node.

After transmitting the validation chain or segment thereof to the node, the mobile device may receive an access authorization token generated by the first instance of the peer application running on the node. The node may transmit the access authorization token to the mobile device by modulating current applied to the 360-degree projection LED bulb.

Upon receiving the access authorization token from the node, the mobile device may commit the received access authorization token to its locally stored validation chain. The mobile device may present the access authorization token from the node to access to access any other node on the secure network.

The access authorization token received by the mobile device from the node may expire a predetermined time after being committed to the validation chain. Expiration of access authorization token may be implemented by the second instance of the peer application running on the mobile device adding a new entry to the locally stored validation chain. The new entry, which indicates that the access authorization token has expired, may be shared with other nodes on the secure network. The new entry may be stored on the DHT associated with the secure network.

The node may confirm an integrity of the validation chain stored locally on the mobile device. For example, the node may examine a validation chain or segment thereof stored on the mobile device. The node may confirm the integrity of the validation chain by confirming that the data provided by the mobile device conforms to validation rules defined by the peer application. The node may generate the access authorization token in response to confirming that the data provided by the mobile device conforms to the validation rules.

Confirming that the data conforms to the data validation rules may ensure that the mobile device is running an instance of the peer application that includes the identical validation rules. The mobile device may be granted the access authorization token because the validation rules ensure that the mobile device, while connected to the secure network, cannot take any action that will violate the validation rules or compromise integrity of data stored in the network's DHT.

The first instance of the peer application running on the node may be configured to share the access authorization token granted to the mobile device with at least one other node on the secure network. The one other node may also share the granted access authorization token with other nodes. The progressive sharing of the granted access authorization token may be governed by the validation rules defined by the peer application. The granted access authorization token may be shared such that each node on the secure network is aware or has access to node that is aware, that the mobile device has been granted the access authorization token.

The node may be a first node. The mobile device may be configured to present the access authorization token to a second node on the secure network. The second node may be configured to grant the mobile device access to the secure network by auditing the validation chain stored locally on the mobile device, without communication with the first node.

Methods for an agent-centric, frictionless data authentication for a mobile device is provided. The mobile device may have limited battery capacity and limited bandwidth relative to a desktop computer system. The methods may allow the mobile device to self-authenticate to join a secure network. Self-authentication may consume less power and bandwidth compared to other authentication methods. For example, self-authentication may not require an ongoing connecting to the authenticating computer system. After being authenticated, the mobile device may freely roam the secure network and present credentials stored locally to access any node on the secure network.

Methods may include exposing a photodiode embedded in the mobile phone to a light signal. The light signal may be emitted by a 360-degree projection LED bulb. Light emitted by the 360-degree projection LED bulb may be controlled by a node on the secure network. The controlling node may be a network gateway. Methods may include transmitting a segment of a first validation chain stored locally on the mobile device to the network gateway.

A specific segment of the validation chain may be identified in the light signal received by the mobile device. Methods may include auditing the validation chain segment at the network gateway. Based on the auditing, methods may include granting the mobile device access to the secure network. Auditing the segment may confirm that the segment conforms to validation rules in effect on the secure network.

Based on auditing the segment, methods may include granting the mobile device access to a first node. Based on auditing the segment, methods may include denying the mobile device access to a second node. For example, if the auditing cannot confirm validity of the segment, the mobile device may be denied access to the secure network. The second node may only be accessible on the secure network. If the mobile device is denied access to the secure network, methods may include sharing the denial with all nodes on the secure network.

The first node may be accessible on an unsecure network, such as the internet. Even if the mobile device is denied access to the secure network, the mobile device may be granted access to the unsecure network. The mobile device may access the internet via light communication with a LED bulb.

Methods may include the mobile device interacting with a first node on the secure network. The interaction with the first node may generate a data entry. Methods may include adding the data entry to a first validation chain stored locally on the mobile device. Methods may include adding the data entry to a second validation chain stored locally on the first node.

Methods may include the mobile device interacting with a second node on the secure network. The interaction with the second node may include granting the mobile device access to a secure service hosted by the second node. The secure service may include an online banking portal. The secure service may include a purchase from an online merchant.

The second node may grant the mobile device access to the secure service based on auditing the data entry stored in the first validation chain. The second node may grant the mobile device access to the secure service based on auditing a length (e.g., number of data entries) of the first validation chain. The second node may grant the mobile device access to the secure service based on auditing the entry stored in the second validation chain.

A data entry stored in the first validation chain may accessed via the mobile device. A data entry stored in the second validation chain may accessed via the first node. A data entry stored in the first or second validation chain may be accessed via another node that has been requested to store data entries as part of a DHT associated with the secure network. Auditing a data entry may confirm that the data entry conforms to validation rules in effect on the secure network. Each node on the secure network may be running a copy of a peer application that defines the validation rules in effect on the secure network.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

Figure 1:
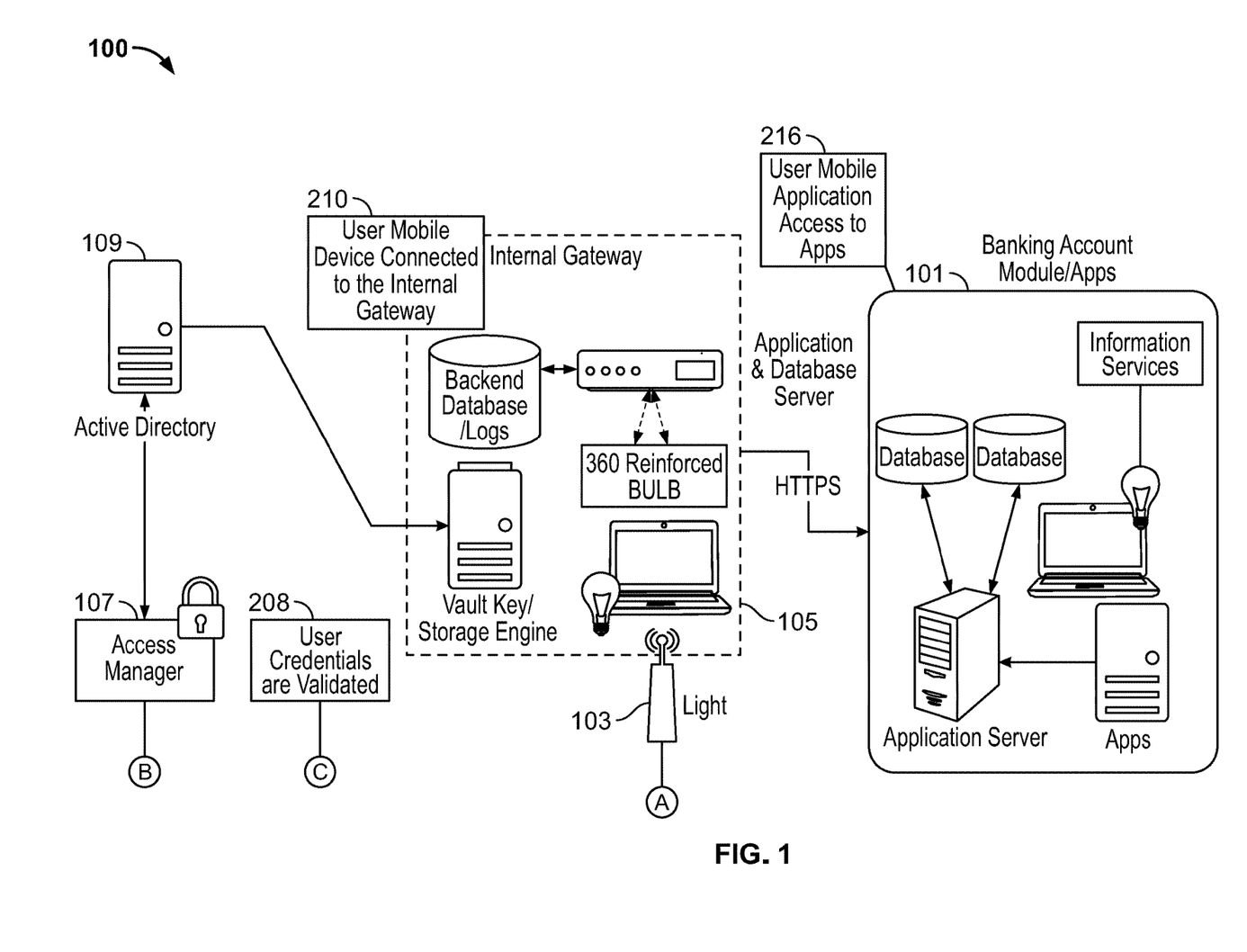
FIG. 1 shows components of an illustrative communication network in accordance with principles of this disclosure.
Figure 2:
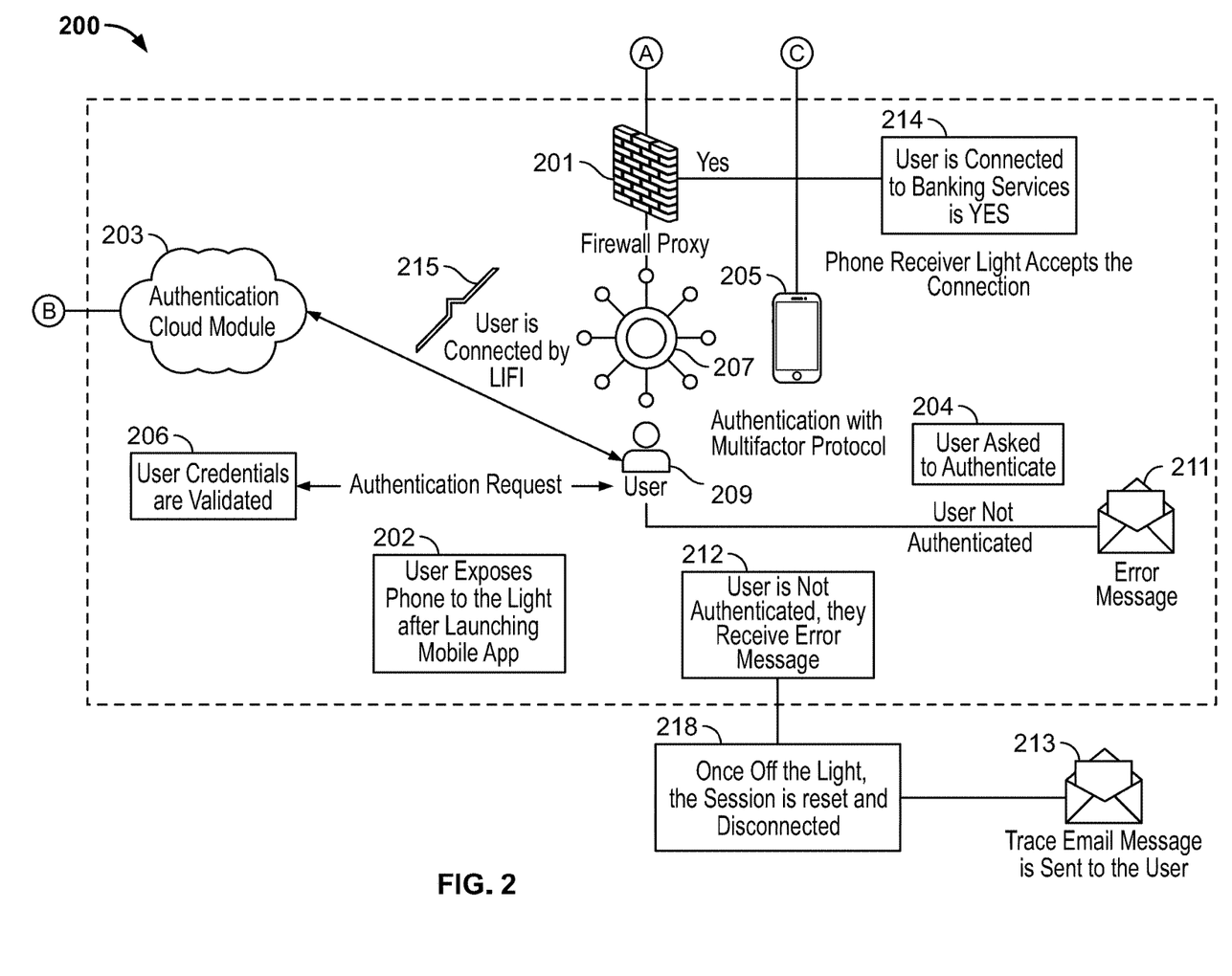
FIG. 2 shows components of an illustrative communication network in accordance with principles of this disclosure.

FIGS. 1 and 2 show an illustrative communication network and method for authenticating a user to access the network. At step 202, user 209 exposes a light receptor (see, e.g., FIGS. 3 and 4) of mobile device 205 to light source 103. User 209 may first launch a mobile application that is configured to process light signals. The mobile app may include an instance of a peer application. Other instances on the peer application may be running on other nodes on the network side of firewall 201. At step 204, user 209 is prompted form authentication credentials to access the communication network.

Authentication credentials may include a validation chain or segment thereof stored on mobile device 205. At step 206, the authentication credentials provided by user 209 are validated. Validation of authentication credentials may include confirming that data stored on mobile device 205 conforms to validation rules defined by the peer application. Validation of authentication credentials may include confirming that data generated by mobile device 205 and stored on DHT 207 conforms to validation rules defined by the peer application.

At step 208, user credentials are validated by access manager 107. Access manager 107 may be a computer system dedicated to validating user credentials. In other embodiments, access manager 107 may be a node on the communication network. Active directory 109 may store traditional usernames and passwords. User 209 may submit a traditional username/password instead of, or in addition to, authentication based on a validation chain locally on mobile device 205. For example, data stored in the validation chain may be used as a second factor authentication method in addition to validating a traditional username/password. Access manager 107 may determine whether the submitted username/password conforms to a valid username/password stored in active directory 109.

At step 210, after credentials of user 209 are successfully validated, mobile device 205 is connected to network gateway 105. Network gateway 105 provides access to secure network 101. At step 214, user 209 is provided access to services accessible on secure network 101. Providing access to secure network 101 may include providing mobile device 205 with an access authorization token. Secure network 101 may include nodes that provide banking services or other financial services.

Mobile device 205 may present the access authorization token to access a node on secure network 101. For example, a node on secure network 101 may be an automated teller machine ("ATM"). Mobile device 205 may present the access authorization token to gain access to services provided by the ATM.

At step 216, user 209 utilizes mobile device 205 to access services provided nodes on secure network 101. Mobile device 205 accesses secure network 101 via network gateway 105. Communication between network gateway 105 and mobile device 205 is conducted using light signals. For example, FIG. 1 shows that network gateway 105 uses light source 103 to transmits light signals to mobile device 205.

At step 212, if credentials of user 209 are not successfully validated, an error message is generated. The generated error message may be propagated to nodes on secure network 101 using a gossip communication protocol. The next time user 209 attempts to access secure network 101, a traditional username and password may be required. The next time user 209 attempts to access secure network 101, user 209 may be required to submit credentials (e.g., driver's license) for review by a human agent.

Step 218 shows that access to secure network 101 is dependent on exposure of mobile device 205 to light source 103 associated with network gateway 105. When mobile device 205 is no longer exposed to light source 103, network gateway 105 will terminate the connection to secure network 101. Network gateway 105 may wait a predetermined amount of time before disconnecting mobile device 105 from secure network 101. The predetermined amount of time may reduce risk that user 209 has inadvertently moved mobile device 205 out of a direct line of sight with light source 103.

Figure 3:
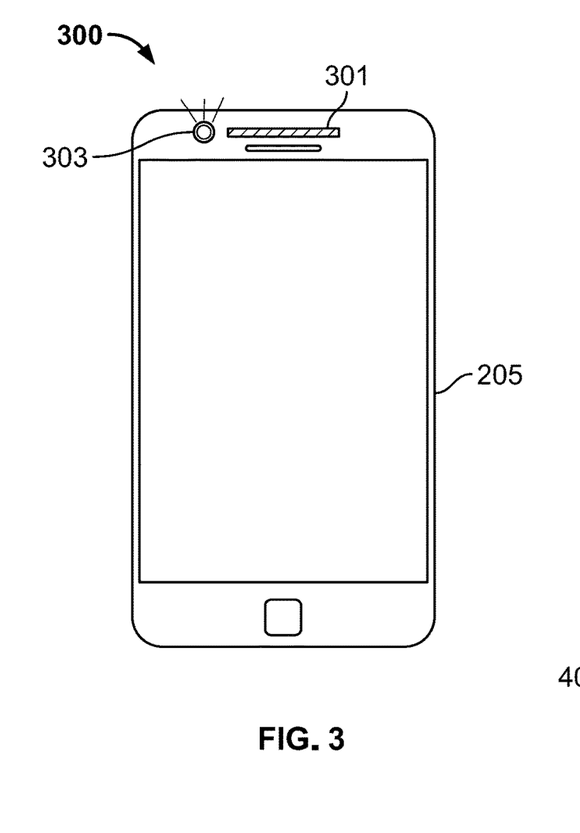
FIG. 3 shows an illustrative apparatus that may be used to access a communication network in accordance with principles of this disclosure.

FIG. 3 shows illustrative apparatus 300. Apparatus 300 shows that mobile device 205 (also shown in FIG. 2) includes light receptor 301. Light receptor 301 may receive light signals from a light source such as light source 103 (shown in FIG. 1). Light receptor 301 may convert received light signals into electrical signals.

Apparatus 300 shows that mobile device 205 also includes light emitter 303. Light emitter 303 may be used to transmit light signals generated by mobile device 205. A network node, such as network gateway 103 (shown in FIG. 1) may also include a light receptor for receiving light signals from mobile device 205.

FIG. 3 shows that light receptor 301 and light emitter 303 are embedded in a front facing screen bezel of mobile device 205. Light emitter 303 may be a monochrome LED or multi-color (e.g., "Red, Green, Blue" or "Cyan, Magenta, Yellow, Black") LED. Light receptor 301 may be a passive circuit that only draws power when a light signal is received by mobile device 205. The light signal received by light receptor 301 may also provide power to light receptor 301. For example, light receptor 301 may include a photovoltaic cell or panel. In other embodiments, mobile device 205 may include a stand-alone photovoltaic cell or panel that generates power for light receptor 301.

Figure 4:
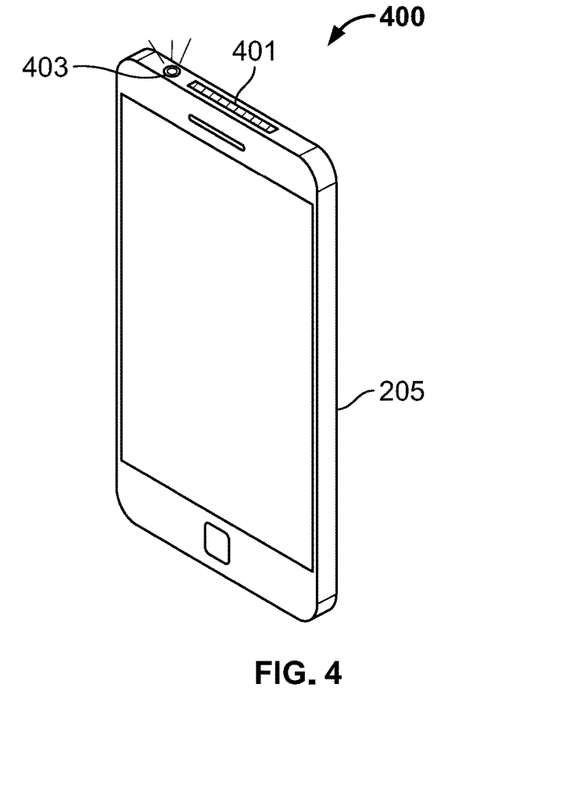
FIG. 4 shows an illustrative apparatus that may be used to access a communication network in accordance with principles of this disclosure.

FIG. 4 shows illustrative apparatus 400. Apparatus 400 shows that mobile device 205 includes light receptor 401. Light receptor 401 may include one or more features of light receptor 301. For example, light emitter 403 may be a monochrome LED or multi-color (e.g., "Red, Green, Blue" or "Cyan, Magenta, Yellow, Black") LED. Light receptor 401 may receive light signals from a light source, such as light source 103 (shown in FIG. 1). Light receptor 401 may convert received light signals into electrical signals.

Apparatus 400 shows that mobile device 205 also includes light emitter 403. Light emitter 403 may include one or more features of light emitter 303. For example, light receptor 401 may be a passive circuit that only draws power when a light signal is received by mobile device 205. Light emitter 403 may be used to transmit light signals generated by mobile device 205.

FIG. 4 shows that light receptor 301 and light emitter 303 are embedded in a thickness of mobile device 205 such that light is received and emitted from a top of mobile device 205. A position of light receptor 401 and light emitter 403 may allow a user to access a touch screen of mobile device without moving mobile device 205 out of a line-of-sight with a light source.

In some embodiments (not shown), mobile device 205 may include light emitter 303 and light receptor 401. In some embodiments (not shown), mobile device 205 may include light emitter 403 and light receptor 301.

Figure 5:
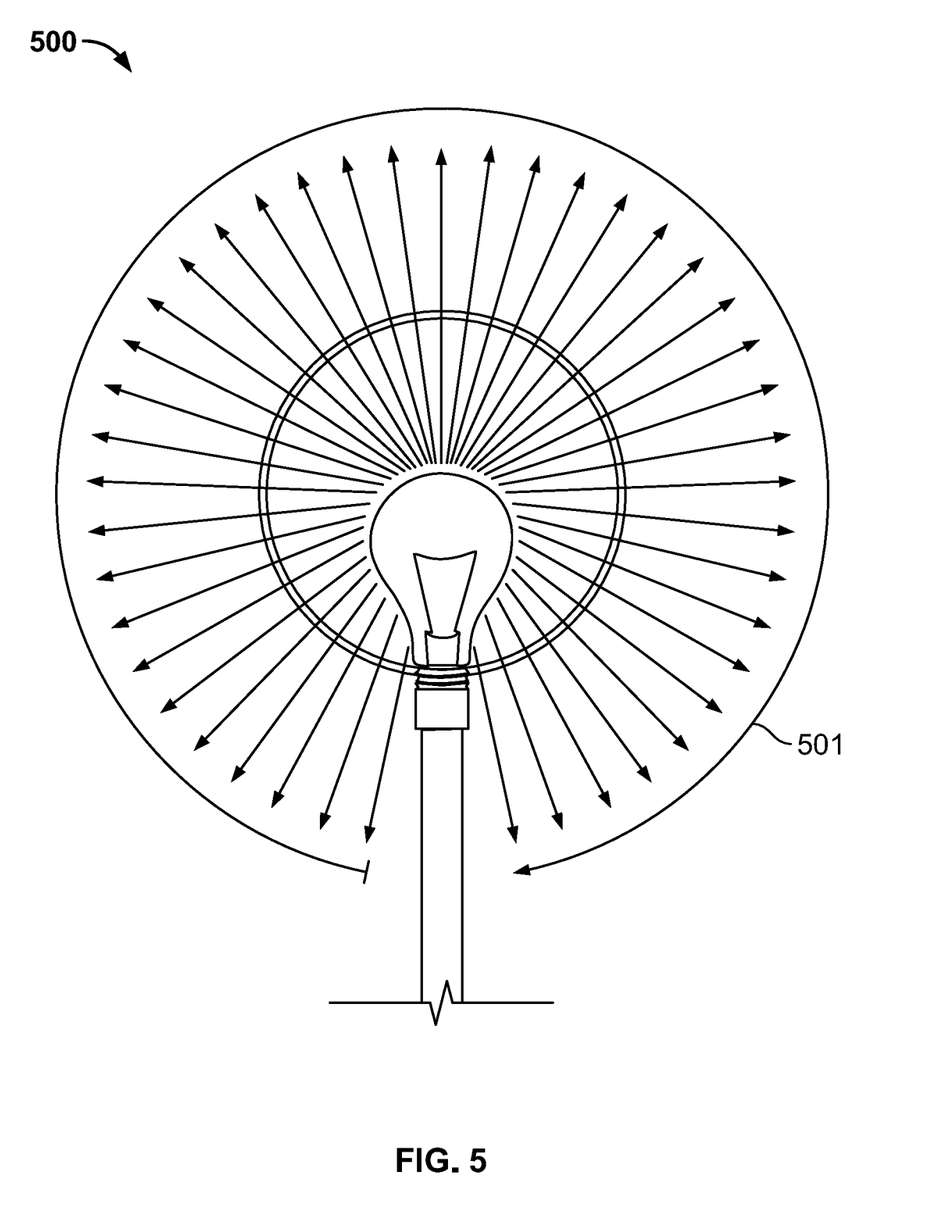
FIG. 5 shows an illustrative light source for generating communication signals for a network in accordance with principles of this disclosure.

FIG. 5 shows illustrative LED bulb 500 that may be used as light transmitter, such as light source 103. Indicator arrow 501 shows that light emitted from LED bulb 500 projects a full 360° around LED bulb 500. Projecting light 360-degrees around the bulb allows any device within a line of sight of LED bulb 500 to receive data signal encoded by light emitted by LED bulb 500.

Signal encoded in light emitted by LED bulb 500 may be controlled by network gateway 105 (shown in FIG. 1). Network gateway 105 may encode data in light emitted by LED bulb 500 by varying the current or voltage applied to LED bulb 500. Varying the current or voltage may switch LED bulb 500 on/off. A light receptor, such as light receptor 301 (shown in FIG. 3) or 401 (shown in FIG. 4) may register the on/off pattern of LED bulb 500 as digital 1s and 0s.

Figure 6:
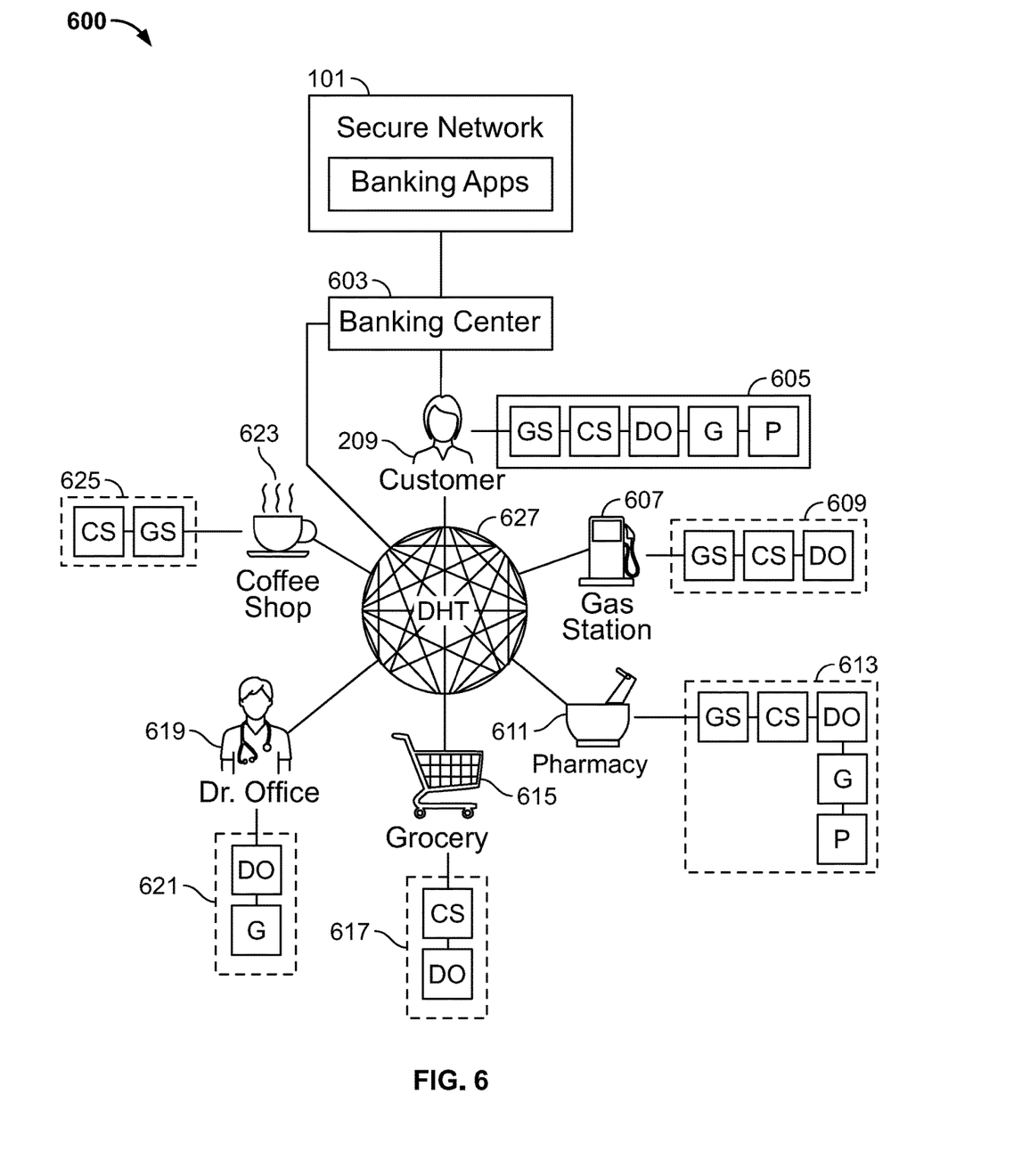
FIG. 6 shows an illustrative authentication scheme for access to a network in accordance with principles of this disclosure.

FIG. 6 shows illustrative authentication scheme 600 for authorizing access to secure network 101 shown in FIG. 1. Scheme 600 shows that user 209 (shown in FIG. 2) is associated with validation chain 605. Validation chain 605 may include a series of interaction between user 209 and one or more of nodes connected to DHT 627. An exemplary interaction may be a purchase transaction or ATM transaction. Validation chain 605 may be stored locally on mobile device 205 (shown in FIG. 2).

Scheme 600 shows that each of the nodes (607, 611, 615, 619 and 623) connected to DHT 627 may store a segment of validation chain 605. Each of the nodes connected to DHT may be running a peer application that applies identical validation rules to any transaction processed by a node. FIG. 6 shows that node 623 stores segment 625. Node 619 stores segment 621. Node 615 stores segment 617. Node 611 stores segment 613. Node 607 stores segment 609. When user 209 requests access to secure network 101, network gateway 105 may authenticate user 209 based on whether validation chain 605 conforms with validation rules in effect on secure network 101.

Network gateway 105 may be positioned in banking center 603. Network gateway 105 may confirm that one or more segments of validation chain 605 have been validated by nodes on DHT 627. Validating one or more segments of validation chain 605 by nodes on DHT 627 indicates that the nodes have confirmed that the data stored in validation chain 605 conforms to the validation rules in effect on secure network 101. Because user 209 is associated with validation chain 605 which conforms to known validation rules, user 209 may be granted access to secure network 101.

Figure 7:
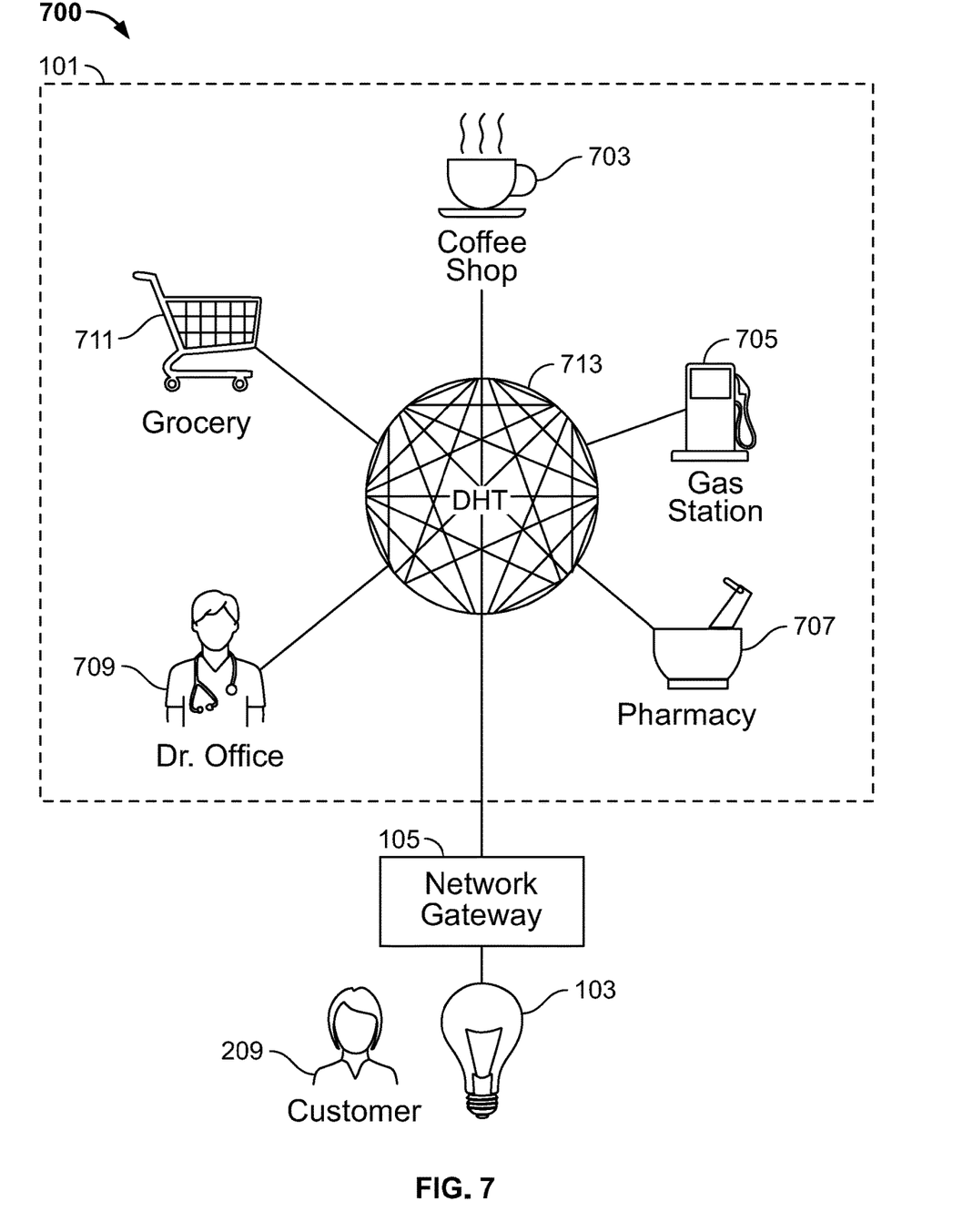
FIG. 7 shows another aspect of the authentication scheme for shown in FIG. 6.

FIG. 7 shows another illustrative architecture 700. Architecture 700 shows that nodes (703, 705, 707, 709 and 711) connected to DHT 713 may not interact directly with user 209 or mobile device 205. In architecture 700, nodes connected to DHT 713 may be part of secure network 101. User 209 may only access nodes connected to DHT 713 via network gateway 105.

After user 209 is granted access to secure network 101, then user 209 may also have access to nodes 703, 705, 707, 709 and 711. Via secure network 101, user 209 may interact with nodes connected to DHT 713. However, using architecture 700, absent a connection to secure network 101 via network gateway 105, user 209 is unable to interact directly with nodes 703, 705, 707, 709 or 711.

Figure 8:
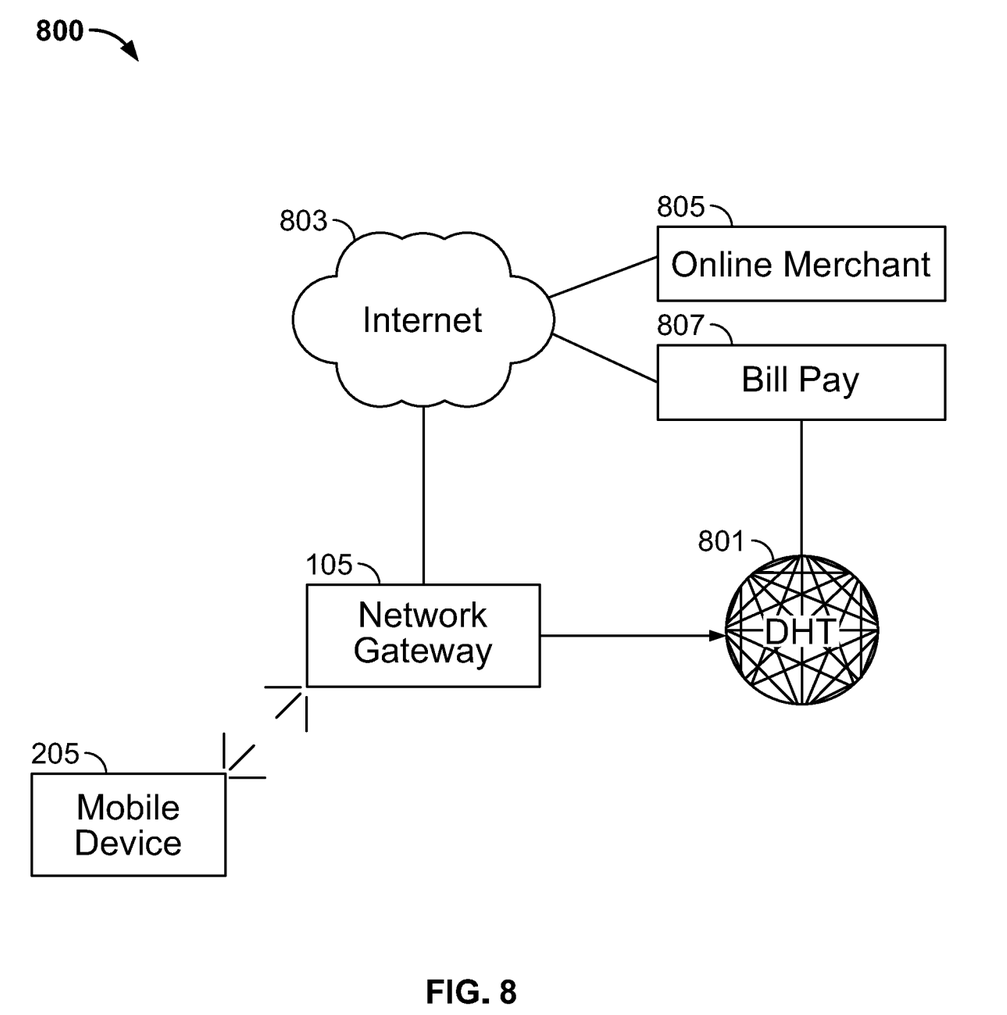
FIG. 8 shows an illustrative network architecture for providing access to secure and unsecure services in accordance with principles of this disclosure.

FIG. 8 shows illustrative network architecture 800 for providing access to secure and unsecure services. Architecture 800 shows that mobile device 205 is connected via light source 103 to network gateway 105. Using the connection to network gateway 105, mobile device 205 is provided access to internet 803. Via the light-based connection to network gateway 105, mobile device 205 is also provided access to internet 803.

Internet 803 may be an unsecure network. Network gateway 105 may not authenticate mobile device 205 before allowing access to internet 803. Network gateway 105 may only require one-factor authorization to gain access to internet 803. When accessing internet 803, mobile device 205 may need to utilize conventional authentication methods to interact with online merchant 805.

However, architecture 800 shows that mobile device 205 has two options for accessing bill pay service 807. Mobile device 205 may access bill pay service 807 through internet 803. Mobile device 205 will then need to interact with bill pay server 807 using conventional authentication methods, such a username/password. Architecture 800 also shows that mobile device 205 may access bill pay service 807 through DHT 801. Accessing bill pay service 807 through DHT 801 may allow mobile device 205 to interact with bill pay service 807 based on a validation chain stored locally on mobile device 205. Utilizing a locally stored validation chain may provide for frictionless authentication and secure access to bill pay service 807.

Thus, apparatus and methods for LIGHT FIDELITY TRANSMISSION NETWORK SECURED WITH FRICTIONLESS AGENT-CENTRIC AUTHENTICATION DATA CHAINS have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An agent-centric method of frictionless data authentication and transfer for a mobile device having limited battery capacity and limited bandwidth relative to a desktop computer system, the method comprising:
   exposing a light receptor embedded in the mobile device to a light source controlled by a first copy of a peer application;

in response to the light receptor capturing a light signal emitted by the light source, using a second copy of the peer application running on the mobile device:
formulating an authentication token based on a validation chain stored locally on the mobile device; and
using a light emitter embedded in the mobile device, transmitting the authentication token to the first copy of the peer application to request access to a secure network;
via the light source, receiving an access authorization token generated by the first copy of the peer application; and
presenting the access authorization token to access to any node on the secure network.

2. The agent-centric method of claim 1, further comprising:
using the second copy of the peer application running on the mobile device, formulating a transaction for execution by a target node on the secure network;
using the light emitter, transmitting the transaction and the access authorization token to the target node;
using the light receptor, receiving an acceptance of the transaction generated by a third copy of the peer application running on the target node;
adding the transaction and the acceptance to the validation chain stored locally on the mobile device; and
sharing a copy of the transaction and the acceptance with a threshold number of nodes on the secure network.

3. The agent-centric method of claim 2, wherein the third copy of the peer application validates the access authorization token by confirming that the access authorization token generates an expected hash value.

4. The agent-centric method of claim 2, wherein the third copy of the peer application validates the transaction by:
requesting that a threshold number of nodes on the secure network validate the transaction; and
receiving confirmation from each of the threshold number of nodes that the transaction has been successfully validated.

5. The agent-centric method of claim 4, wherein each of the threshold number of nodes are running their own local copy of the peer application.

6. The agent-centric method of claim 4 wherein the threshold number of nodes are determined relative to a geographic location of the mobile device.

7. The agent-centric method of claim 2, wherein the sharing the copy of the transaction and the acceptance with the threshold number of nodes on the secure network comprises storing the transaction and the acceptance in a distributed hash table.

8. The agent-centric method of claim 7, wherein the distributed hash table is only stored by nodes on the secure network.

9. The agent-centric method of claim 1, further comprising:
using the light receptor, receiving a transaction request from a target node on the secure network;
using the second copy of the peer application running on the mobile device, attempting to validate the transaction request; and
in response to determining that transaction request is invalid informing at least two other nodes on the secure network that the transaction request received from the target node has been rejected.

10. The agent-centric method of claim 1, further comprising providing to the mobile device:
access to an unsecure network via the light source; and
an application program interface for allowing any node on the unsecure network to securely interact with the mobile device based on presenting the access authorization token.

11. The agent-centric method of claim 1, wherein the light source transmits information to the mobile device by modulating light emitted from the light source at a frequency that is not perceptible by a human eye.

12. An agent-centric data communication system configured for frictionless authentication, the system comprising:
a node on a secure network comprising a photodiode and a 360-degree projection LED bulb, the node running a first instance of a peer application that is configured to:
receive light signals captured by the photodiode; and
transmit light signals by altering an electrical current applied to the 360-degree projection LED bulb; and
a mobile device comprising a light emitter, a light receptor and a processor running a second instance of the peer application, the mobile device configured to:
formulate an authentication token using the second instance of the peer application;
commit the authentication token to a validation chain stored locally on the mobile device;
using the light emitter, transmit the validation chain to the node;
via the light receptor, capture an access authorization token generated by the first instance of the peer application and transmitted using the 360-degree projection LED bulb;
commit the access authorization token to the validation chain stored locally on the mobile device; and
present the access authorization token to access any node on the secure network.

13. The agent-centric data communication system of claim 12, wherein the access authorization token expires after a predetermined time from when the access authorization token is committed to the validation chain.

14. The agent-centric data communication system of claim 12, wherein the light receptor is a passive receiver and only draws power when the light signals are received by the mobile device.

15. The agent-centric data communication system of claim 12, wherein the first instance of the peer application generates the access authorization token by confirming integrity of the validation chain stored locally on the mobile device.

16. The agent-centric data communication system of claim 12, wherein the first instance of the peer application shares the access authorization token with at least one other node on the secure network.

17. The agent-centric data communication system of claim 12 wherein:
the node is a first node;
the mobile device is configured to present the access authorization token to a second node on the secure network; and
the second node is configured to grant the mobile device access to the secure network by auditing the validation chain stored locally on the mobile device, without communication with the first node.

18. An agent-centric method of frictionless data authentication for a mobile device having limited battery capacity and limited bandwidth relative to a desktop computer system, the method comprising:
exposing a photodiode embedded in the mobile device to a light signal emitted by a 360-degree projection LED bulb;

transmitting a segment of a first validation chain stored locally on the mobile device to a network gateway that controls access to a secure network, wherein the segment is identified by the light signal;

auditing the segment at the network gateway;

based on the auditing, connecting the mobile device to the secure network;

interacting with a first node on the secure network, wherein the interaction comprises adding an entry to the first validation chain stored locally on the mobile device and adding the entry to a second validation chain stored locally on the first node; and interacting with a second node on the secure network, wherein the interaction comprises granting the mobile device access to a secure service based on auditing the entry stored in the first validation chain and the entry stored in the second validation chain.

19. The agent-centric method of claim 18 further comprising, based on the auditing of the segment:

granting the mobile device access to the first node; and denying the mobile device access to the second node.

20. The agent-centric method of claim 19 further comprising, sharing a record of denying the mobile device access with all nodes on the secure network.

* * * * *